United States Patent
Kwon et al.

(10) Patent No.: US 9,253,724 B2
(45) Date of Patent: Feb. 2, 2016

(54) TRANSMISSION APPARATUS, RECEPTION APPARATUS, AND COMMUNICATION METHOD

(75) Inventors: Ui Kun Kwon, Hwaseong-si (KR); Young Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 13/197,049

(22) Filed: Aug. 3, 2011

(65) Prior Publication Data

US 2012/0188923 A1 Jul. 26, 2012

(30) Foreign Application Priority Data

Jan. 25, 2011 (KR) .................. 10-2011-0007354

(51) Int. Cl.
*G08C 17/00* (2006.01)
*H04W 52/02* (2009.01)

(52) U.S. Cl.
CPC ............ *H04W 52/0212* (2013.01); *Y02B 60/50* (2013.01)

(58) Field of Classification Search
CPC .. H04W 52/02; H04W 52/0203; H04W 84/12
USPC ............... 370/310.2, 311, 310, 314
See application file for complete search history.

(56) References Cited

U.S. PATENT DOCUMENTS

| | | | | |
|---|---|---|---|---|
| 7,920,536 | B1 * | 4/2011 | Kunz et al. | 370/338 |
| 8,437,317 | B2 * | 5/2013 | Jang et al. | 370/336 |
| 2002/0114286 | A1 * | 8/2002 | Iwamura et al. | 370/252 |
| 2004/0042435 | A1 * | 3/2004 | Soomro et al. | 370/338 |
| 2004/0047351 | A1 * | 3/2004 | Del Prado Pavon et al. | 370/395.4 |
| 2004/0171346 | A1 * | 9/2004 | Lin | 455/3.05 |
| 2005/0135307 | A1 | 6/2005 | Yang et al. | |
| 2005/0213534 | A1 | 9/2005 | Benveniste | |
| 2006/0050709 | A1 * | 3/2006 | Sung et al. | 370/394 |
| 2006/0053189 | A1 * | 3/2006 | Mantor | 708/490 |
| 2007/0002887 | A1 * | 1/2007 | Benveniste | 370/437 |
| 2007/0281641 | A1 | 12/2007 | Kim et al. | |
| 2008/0037570 | A1 | 2/2008 | Kim et al. | |
| 2008/0095091 | A1 * | 4/2008 | Surineni et al. | 370/311 |
| 2008/0112351 | A1 | 5/2008 | Surineni et al. | |
| 2008/0126158 | A1 * | 5/2008 | Notea | 705/7 |
| 2008/0232286 | A1 * | 9/2008 | Habetha et al. | 370/311 |
| 2009/0059834 | A1 | 3/2009 | Qian | |

(Continued)

FOREIGN PATENT DOCUMENTS

EP 2120507 A1 11/2009
JP 2009-522930 A 6/2009

(Continued)

OTHER PUBLICATIONS

International Search Report mailed Mar. 26, 2012, issued in counterpart International Patent Application No. PCT/KR2011/006188; 3 pages.

(Continued)

*Primary Examiner* — Hassan Phillips
*Assistant Examiner* — Siren Wei
(74) *Attorney, Agent, or Firm* — NSIP Law

(57) ABSTRACT

Provided are a transmission apparatus, a reception apparatus, and a communication method thereof that may decrease power consumption of a terminal by reducing an amount of time used by the terminal to overhear a frame or a packet to be transmitted to another terminal, or an amount of time used to receive a frame or a packet to be transmitted to the terminal.

26 Claims, 8 Drawing Sheets

(56) References Cited

U.S. PATENT DOCUMENTS

| | | | |
|---|---|---|---|
| 2009/0086664 A1 | 4/2009 | Wu | |
| 2010/0039973 A1 | 2/2010 | Cavalcanti et al. | |
| 2011/0103280 A1* | 5/2011 | Liu et al. | 370/311 |
| 2011/0317630 A1* | 12/2011 | Zhu et al. | 370/329 |

FOREIGN PATENT DOCUMENTS

| | | | | |
|---|---|---|---|---|
| JP | 2010-093613 A | | 4/2010 | |
| KR | 10-0643477 | | 10/2006 | |
| KR | 10-2010-0052523 | | 5/2010 | |
| WO | WO 2006000617 A1 | * | 1/2006 | ............. H04L 12/28 |
| WO | WO 2009078606 A1 | * | 6/2009 | ............ H04W 72/04 |
| WO | WO 2010/099491 A2 | | 9/2010 | |

OTHER PUBLICATIONS

Japanese Office Action issued on Oct. 21, 2014 in counterpart Japanese Application No. JP 2013-551884 (6 pages, with partial English translation).

* cited by examiner

TRANSMISSION APPARATUS, RECEPTION APPARATUS, AND COMMUNICATION METHOD

CROSS-REFERENCE TO RELATED APPLICATION(S)

This application claims the benefit under 35 U.S.C. §119(a) of Korean Patent Application No. 10-2011-0007354, filed on Jan. 25, 2011, in the Korean Intellectual Property Office, the entire disclosure of which is incorporated herein by reference for all purposes.

BACKGROUND

1. Field

The following description relates to a transmission apparatus, a reception apparatus, and a communication method of the transmission apparatus and the reception apparatus.

2. Description of Related Art

Recently, the performance of a transmission apparatus and a reception apparatus that transmit/receive data using a radio channel have been enhanced. As a result, the transmission apparatus may transmit data at a relatively high data rate and the reception apparatus may receive data at a relatively high data rate.

However, as the data rate has increased, power consumption of the reception apparatus has been degraded. For example, if the reception apparatus is powered by a battery, an amount of power consumed by the reception apparatus may become an important factor to determine the performance of the reception apparatus. Accordingly, there is a desire for a technology that may decrease the power consumption of the reception apparatus.

SUMMARY

In one general aspect, there is provided a communication method of a transmission apparatus, the method including maintaining a stream corresponding to one or more terminals that have succeeded in obtaining a transmission opportunity (TXOP) with respect to a channel, and transmitting a TXOP setting frame in which the one or more terminals are set to receive a corresponding stream for a duration of the TXOP, and in which at least one other terminal that was unsuccessful in obtaining the TXOP is set to operate in a power saving mode.

The method may further comprise simultaneously transmitting streams corresponding to the one or more terminals using the channel for the duration of the TXOP.

The method may further comprise indicating a predetermined terminal of the one or more terminals to operate in the power saving mode.

The method may further comprise suspending transmission of data to the predetermined terminal for a remainder of the duration of the TXOP.

The indicating may comprise generating an indicator indicating that there is no more data to be transmitted to the predetermined terminal for the remainder of the TXOP duration.

The generating may comprise generating the indicator indicating that there is no more data to be transmitted to the predetermined terminal, using a preamble of a packet to be transmitted to the predetermined terminal or a header of a media access control (MAC) frame to be transmitted to the predetermined terminal.

In response to additional data occurring in the TXOP that is to be transmitted to the predetermined terminal in power save mode, the method further comprises buffering the additional data until a next TXOP.

The method may further comprise including information about the one or more terminals in control information of a data frame for the one or more terminals, and transmitting the information.

The TXOP setting frame may comprise information that is used to set the time duration of the TXOP, and that is generated such that it is capable of being decoded by the one or more terminals that succeeded in obtaining the TXOP and the at least one other terminal that was unsuccessful in obtaining the TXOP.

The TXOP setting frame setting may comprise an identifier (ID) of a basic service set (BSS) or an ID of a cell including the one or more terminals to prevent the one or more terminals from erroneously switching to the power saving mode according to an instruction from another transmission apparatus.

The one or more terminals and the at least one other terminal may be terminals belonging to predetermined groups that have the same group ID.

In another aspect, there is provided a communication method of a reception apparatus, the method including receiving a transmission opportunity (TXOP) setting frame to in which one or more terminals that have succeeded in obtaining a TXOP with respect to a channel are set to receive a corresponding stream from a transmission apparatus for a duration of the TXOP, and at least one other terminal that was unsuccessful in obtaining the TXOP is set to operate in a power saving mode, and in response to the received TXOP setting frame, receiving a stream from the transmission apparatus for the duration of the TXOP, or setting an operation mode to the power saving mode.

The streams corresponding to the one or more terminals may be simultaneously transmitted using the channel for the duration of the TXOP.

The method may further comprise verifying whether the TXOP setting frame comprises an identifier (ID) of a basic service set (BSS) or an ID of a cell including the reception apparatus.

The method may further comprise determining whether the reception apparatus corresponds to a terminal from among the one or more terminals, and transmitting a response frame with respect to the TXOP setting frame based on the determination result.

The method may further comprise receiving an indicator indicating that there is no more data to be transmitted to a predetermined terminal from among the one or more terminals, for the remainder of the TXOP duration, and in response to the received indicator, setting the operation mode to the power saving mode.

The method may further comprise maintaining the power saving mode for the duration of the TXOP after a packet corresponding to the indicator is received or after transmitting a block acknowledgement (ACK) with respect to the packet.

The reception apparatus may correspond to a terminal that belongs to predetermined groups that have the same group ID.

The TXOP setting frame may comprise information that is used to set the duration of the TXOP, and that is generated such that it is capable of being decoded by the one or more terminals that succeeded in obtaining the TXOP and the at least one other terminal that was unsuccessful in obtaining the TXOP.

In another aspect, there is provided a computer-readable storage medium having stored therein program instructions to cause a processor of a reception apparatus to implement a method including receiving a transmission opportunity (TXOP) setting frame in which one or more terminals that have succeeded in obtaining a TXOP with respect to a channel are set to receive a corresponding stream from a transmission apparatus for a duration of the TXOP, and at least one other terminal that was unsuccessful in obtaining the TXOP is set to operate in a power saving mode, and in response to the received TXOP setting frame, receiving a stream from the transmission apparatus for the duration of the TXOP, or setting an operation mode to the power saving mode.

In another aspect, there is provided a transmission apparatus including a maintainer to maintain a stream corresponding to one or more terminals that have succeeded in obtaining a transmission opportunity (TXOP) with respect to a channel, and a transmitter to transmit a TXOP setting frame in which one or more terminals that have succeeded in obtaining a TXOP with respect to a channel are set to receive a corresponding stream from the transmission apparatus for a duration of the TXOP, and at least one other terminal that has failed in obtaining the TXOP is set to operate in a power saving mode.

The transmitter may be configured to simultaneously transmit streams corresponding to the one or more terminals using the channel for the duration of the TXOP.

In another aspect, there is provided a reception apparatus including a receiver to receive, from a transmission apparatus, a transmission opportunity (TXOP) setting frame in which one or more terminals have succeeded in obtaining a TXOP with respect to a channel are set to receive a corresponding stream for a duration of the TXOP, and at least one other terminal that was unsuccessful in obtaining the TXOP is set to operate in a power saving mode, and a setting unit to receive a stream from the transmission apparatus for the duration of the TXOP, or to set an operation mode to the power saving mode in response to the received TXOP setting frame.

Streams corresponding to the one or more terminals may be simultaneously transmitted using the channel for the duration of the TXOP.

In another aspect, there is provided a terminal, including a receiver configured to receive a transmission opportunity (TXOP) setting frame that identifies one or more terminals that are to receive data during the TXOP and that indentifies one or more terminals that are not to receive data during the TXOP, and a setting unit configured to set the receiver to power saving mode, in response to an ID corresponding to the terminal being included in the one or more terminals that are not to receive data during the TXOP.

The TXOP setting frame may be included in a first data packet, the TXOP setting frame may indentify that the terminal is to receive data during the TXOP, and the first data packet may further comprise a more data bit (MDB) that indicates whether there is additional data to be transmitted to the terminal during the remainder of the TXOP.

In response to the MDB indicating that the terminal is not to receive an additional data, the setting unit may set the receiver to power saving mode upon completion of receiving the first data packet.

The MDB may be included in preamble of a packet or in a header of a media access control (MAC) frame.

The TXOP setting frame may further include an ID of the transmission apparatus that transmits the TXOP setting frame.

Other features and aspects may be apparent from the following detailed description, the drawings, and the claims.

Figure 1:
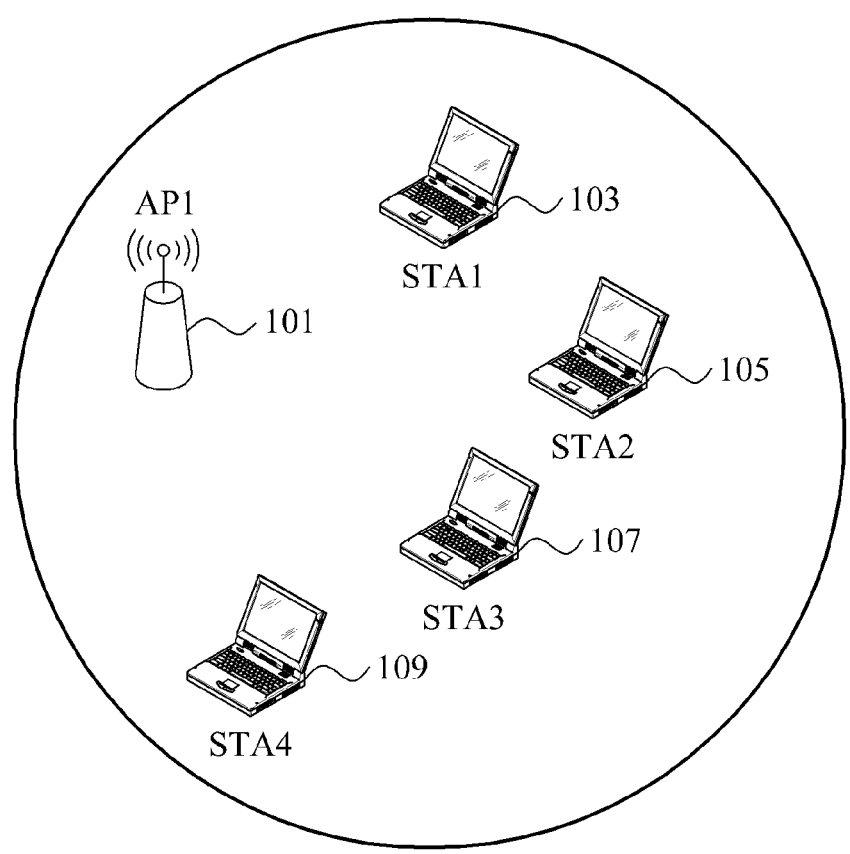
FIG. 1 is a diagram illustrating an example of a network configuration including a transmission apparatus and reception apparatuses.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, a description of well-known functions and constructions may be omitted for increased clarity and conciseness.

The following examples may be applicable to a single-user multiple-input multiple-output (SU-MIMO) communication and a multi-user multiple-input multiple-output (MU-MIMO) communication.

FIG. 1 illustrates an example of a network configuration including a transmission apparatus and reception apparatuses. This example includes a terminal that has succeeded in obtaining a transmission opportunity (TXOP) and a terminal that has failed in obtaining the TXOP. In the examples herein, a terminal may correspond to a mobile terminal such as a smart phone, a computer, a sensor, a home appliance, a tablet, an MP3 player, and the like. Referring to FIG. 1, AP1 101 corresponds to a transmission apparatus that may maintain a stream to each of one or more terminals that have succeeded in a TXOP with respect to a channel. Using the channel, the AP1 101 may simultaneously transmit streams corresponding to the one or more terminals that have succeeded in obtaining the TXOP for a duration of the TXOP.

In this example, a terminal that succeeds in obtaining a TXOP indicates that the AP1 101 transmits a stream for the terminal for a predetermined time duration, for example, a TXOP duration. Conversely, a terminal that fails in obtaining a TXOP indicates that the AP1 101 does not transmit a stream for the terminal for a predetermined time duration, for example, a TXOP duration.

In various examples herein, simultaneously transmitting streams may indicate that the streams of data are simultaneously transmitted in a spatial aspect or they are transmitted using an MU-MIMO communication. However, just because the streams are simultaneously transmitted, it does not necessarily indicate that transmission of streams corresponding to at least one terminal simultaneously start and are simultaneously completed.

For example, if three terminals among the reception apparatuses succeed in obtaining the TXOP, transmission of a stream with respect to each of three terminals may start at a different point in time. Also, a transmission end point in time may also be different, for example, due to a difference in an amount of data to be transmitted to each of three terminals, and the like.

The example of FIG. 1 includes reception apparatuses STA1 103, STA2 105, STA3 107, and STA4 109. In this example, the terminals STA1 103, STA2 105, and the STA3 107 correspond to terminals that have succeeded in obtaining the TXOP and the STA4 109 corresponds to a terminal that has failed in obtaining the TXOP.

The AP1 101 may maintain a stream corresponding to each of the STA1 103, STA2 105, and the STA3 107 which are terminals that have succeeded in obtaining the TXOP. For example, the AP1 101 may simultaneously transmit streams of data corresponding to the STA1 103, STA2 105, and the STA3 107, respectively, using the channel for a duration of the TXOP.

As an example, the reception apparatuses may correspond to terminals that belong to predetermined groups and that have the same group identifier (ID), or separate terminals that do not belong to the predetermined groups.

Figure 2:
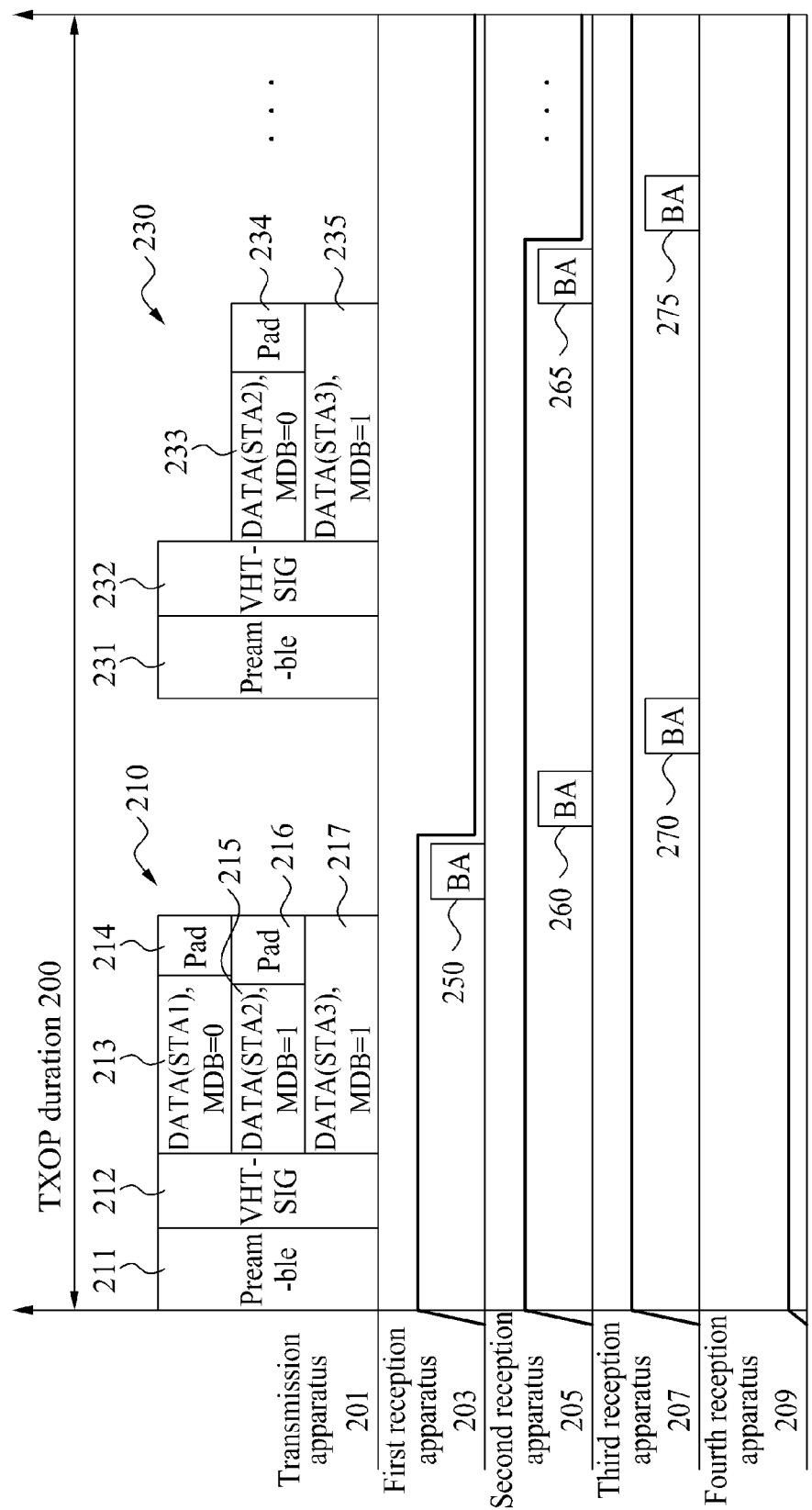
FIG. 2 is a diagram illustrating an example of a communication method using a TXOP.

FIG. 2 illustrates an example of a communication method using a TXOP.

Referring to FIG. 2, transmission apparatus 201 desiring to transmit data to a single terminal or at least one terminal may be assigned a time duration corresponding to a TXOP with respect to a channel. In this example the transmission apparatus 201 is assigned a TXOP duration 200, and the transmission apparatus 201 may exclusively occupy the right to use the channel for the TXOP duration 200.

For example, the transmission apparatus 201 may transmit data to a first reception apparatus 203, a second reception apparatus 205, a third reception apparatus 207, and a fourth reception apparatus 209 using a radio channel of which a TXOP is obtained. In this example, the first reception apparatus 203, the second reception apparatus 205, and the third reception apparatus 207 correspond to terminals that have succeeded in obtaining the TXOP, and the fourth reception apparatus 209 corresponds to a terminal that has failed in obtaining the TXOP.

The transmission apparatus 201 may transmit packets that include control information and data to the first reception apparatus 203, the second reception apparatus 205, the third reception apparatus 207, and the fourth reception apparatus 209, respectively. The control information of data frames for corresponding reception apparatuses may include information that is associated with the first reception apparatus 203, the second reception apparatus 205, and the third reception apparatus 207 that have succeeded in obtaining the TXOP.

The fourth reception apparatus 209 has failed in obtaining the TXOP and thus, may not use the channel. During the TXOP duration 200, the fourth reception apparatus 209 may operate in a power saving mode. In the power saving mode, the fourth reception apparatus 209 may not overhear a frame or a packet to be transmitted to another terminal. In the power saving mode, the fourth reception apparatus 209 may not perform an active reception operation to receive a frame or a packet to be transmitted to the fourth reception apparatus 209, and thus, may minimize the power consumption.

The control information included in a packet may include one or more preambles, for example, preambles 211 and 231.

The preamble may be used for each reception apparatus to estimate a channel or to detect the packet. A very high throughput signal (VHT-SIG) field, for example, VHT-SIG fields 212 and 232 of FIG. 2, may include a control signal for each reception apparatus that receives data at a high data rate.

An example of a control signal is information that is associated with a modulation scheme and a channel coding scheme of data included in each data area of a packet.

As described herein, the packet may include data areas. For example, the data areas may include data to be transmitted to the reception apparatuses. Even though a transmission end point in time of the packet has not terminated, transmission of data included in each data area may be completed. In this example, transmission with respect to a corresponding reception apparatus may be terminated.

For example, in a first packet 210, a first data area 213 may be terminated if transmission of first data is completed, and a second data area 215 may be terminated if transmission of second data is terminated. In the first packet 210, because transmission of third data is not completed by an end point in time of the first packet 210, a third data area 217 may be terminated at the end point in time. In this example, a pad 214 may be added to a rear of the first data area 213, a pad 216 may be added to a rear of the second data area 216, and a pad 234 may be added to a rear of a data area 233.

Each data area may additionally include a transmission complete message with respect to each data. For example, a more data bit (MDB) may be used to indicate whether there is data to be additionally transmitted to each reception apparatus during the TXOP duration 200.

For example, if transmission of the first data finishes within the first packet 210 transmitted for the TXOP duration 200, more data to be transmitted to the first reception apparatus 203 may be absent. In this example, a MDB with respect to the first reception apparatus 203 may be set to '0'. The MDB with respect to the first reception apparatus 203 may be included in an end portion of the first data area 213 and may be transmitted to the first reception apparatus 203.

The first reception apparatus 203 may receive a packet with the MDB set to '0' and may determine that no more data is to be transmitted to the first reception apparatus 203. Accordingly, the first reception apparatus 203 may operate in a power saving mode after transmission of the first data is completed to reduce power consumption.

Even though transmission of third data is completed in the third data area 217 of the first packet 210 and a third data area 235 of a second packet 230, third data to be transmitted to the third reception apparatus 207 may remain. In this example, the remaining data of the third data may be transmitted using a third data area of a subsequent packet. Because there is remaining data of the third data, the MDB may be determined as '1'.

The first reception apparatus 203, the second reception apparatus 205, and the third reception apparatus 207, and the fourth reception apparatus 209 may receive a packet within the TXOP duration 200. Each of the apparatuses may transmit, to the transmission apparatus 201, acknowledgement (ACK) messages or block acknowledgement (BA) messages 250, 260, 265, 270, and 275 with respect to the received packet.

For example, a transmission apparatus may transmit data to a reception apparatus that belongs to predetermined groups that have the same group ID or a separate reception apparatus for a TXOP duration.

If no more data is to be transmitted to a predetermined reception apparatus within a predetermined group for the TXOP duration, the transmission apparatus may indicate in a currently transmitting frame or packet that there is no more data to be additionally transmitted during the TXOP. For example, the transmission apparatus may generate an indicator that indicates that there is no more data to be transmitted to the predetermined reception apparatus for the TXOP duration. For this operation, the transmission apparatus may use a single bit of MDB.

For example, referring to FIG. 2, the transmission apparatus 201 does not have additional data to transmit to the first reception apparatus 203 other than the first data packet 210. Therefore, the MSB corresponding to the first reception apparatus 203 may be set to zero to indicate to the first reception apparatus 203 that no more data will be transmitted to the first reception apparatus 203 during the TXOP 200. In this example, the first reception apparatus 203 may enter power save mode for the remainder of the TXOP 200.

In the example of FIG. 2, in addition to the first packet 210, the transmission apparatus 201 has additional data to transmit to the second reception apparatus 205 and the third reception apparatus 207. Accordingly, the MSB corresponding to each of the second reception apparatus 205 and the third reception apparatus 207 may be set to one to indicate that additional data is to be transmitted to the respective reception apparatus 205 and 207 during the TXOP 200.

After transmission of the second packet 230, the transmission apparatus 201 does not have additional data to transmit to the second reception apparatus 205, but does have additional data to transmit to the third reception apparatus 207. Accordingly, the transmission apparatus 201 may set the MSB corresponding to the second reception apparatus 205 to zero, and may set the MSB corresponding to the third reception apparatus 207 as one. Upon determining that the MSB corresponding to the second reception apparatus 205 is set to zero, the second transmission apparatus 205 may enter the power save state.

In the examples herein, the bit values of zero and one are merely for purposes of example, and should not be understood as limiting the scope of the description. It should be appreciated that any identification may be used, for example, characters, numbers, signals, colors, sizes, and the like.

The MDB may be included in a preamble of a packet or a header of a MAC frame to be transmitted to each reception apparatus. In the example herein, if the MDB corresponding to a reception apparatus is set to '0', the reception apparatus may maintain a power saving mode by the end of the TXOP duration after terminating receiving of a corresponding packet, or after transmitting an ACK or a BA with respect to the corresponding packet.

The transmission apparatus may not transmit data to a corresponding reception apparatus for a remainder of the TXOP duration and the reception apparatus having set the MDB to '0' may operate in the power saving mode.

As another example, if data to be transmitted to the first reception apparatus 203 occurs during the TXOP after the transmission apparatus has indicated that data to be additionally transmitted to the first reception apparatus 203 is absent, the transmission apparatus 201 may buffer the corresponding data in a buffer and transmit the data at a later time, for example, until a subsequent channel is occupied. That is, when data to be transmitted to the first reception apparatus 203 for the remainder of the TXOP duration 200 occurs, the transmission apparatus 201 may buffer data to be transmitted during a subsequent time duration with respect to the first reception apparatus 203.

In this example, 'until the subsequent channel is occupied' may indicate a subsequent time duration corresponding to another TXOP, and may indicate a subsequent TXOP duration of another TXOP duration.

To enable predetermined reception apparatuses such as the first reception apparatus 203, the second reception apparatus 205, and the third reception apparatus 207, that have succeeded in obtaining the TXOP to occupy the channel for a predetermined duration, another reception apparatus such as the fourth reception apparatus 209 that has failed in obtaining the TXOP may avoid a channel access for a corresponding TXOP duration within a cell or a BSS.

To enable the other reception apparatus to avoid the channel access for the corresponding TXOP duration, the TXOP may be set so that each of the reception apparatuses within the cell or the BSS are aware of the above event. A method of setting the TXOP is described with reference to FIG. 3.

Figure 3:
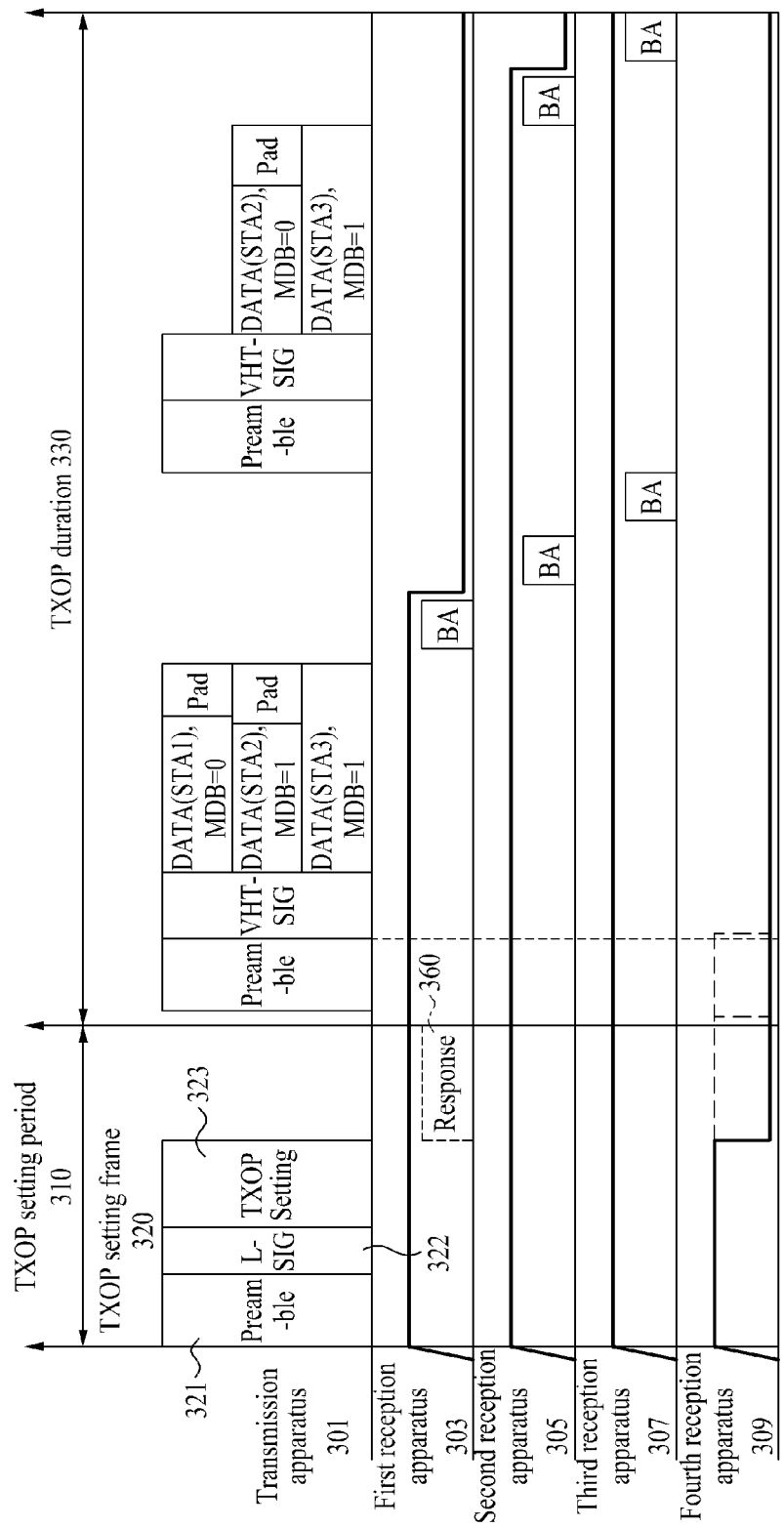
FIG. 3 is a diagram illustrating an example of a TXOP setting period.

FIG. 3 illustrates an example of a TXOP setting period.

Referring to FIG. 3, a transmission apparatus 301 may set a TXOP duration 330 by transmitting a TXOP setting frame 320 in a TXOP setting period 310.

The TXOP setting frame 320 may include information that is used to set the TXOP duration 330. For example, the TXOP setting frame 320 may be transmitted in a form to be overheard by all of reception apparatuses within a cell or a BSS. For example, all reception apparatus within a cell may include reception apparatuses that have succeeded in obtaining a TXOP with respect to a channel and reception apparatuses that have failed in obtaining the TXOP.

For example, a multi-user precoding scheme may not be applied to the TXOP setting frame 320. The TXOP setting frame 320 may be generated to be decodable by all the reception apparatuses within the cell.

If a TXOP power saving indication is included, the TXOP setting frame 320 may include information about whether a TXOP power saving scheme is to be applied, or a target reception group of the TXOP duration 330. For example, the information that is associated with the target reception group may include predetermined groups that have the same group ID and reception apparatuses that belong to the predetermined groups.

If the TXOP setting frame 320 includes information that is associated with the target reception apparatus, reception apparatuses that are excluded from a corresponding reception group may operate in the power saving mode by the end of the TXOP duration 330 after receiving the TXOP setting frame 320.

A single reception apparatus or reception apparatuses that belong to the target reception apparatus may transmit a response frame 360 with respect to the TXOP setting frame 320. For example, the response frame 360 may include a portion of or all of the descriptions included in the TXOP setting frame 320.

Accordingly, hidden nodes that are not receiving the TXOP setting frame 320 may set a TXOP. At least one reception apparatus may transmit a response frame 360. The at least one reception apparatus may transmit the response frame 360 according to a predetermined order and/or a predetermined method. As another example, corresponding information may not be included in the TXOP setting frame 320.

The TXOP setting period 310 may be used to set the time duration of the TXOP with respect to the channel, for example, the TXOP duration 330.

As an example, in the TXOP setting period 310 for setting the TXOP duration 330, the transmission apparatus 301 may transmit the TXOP setting frame 320 to a first reception apparatus 303, a second reception apparatus 305, a third reception apparatus 307, and a fourth reception apparatus 309 that are within a cell.

The TXOP setting frame 320 may be used for at least one reception apparatus that has succeeded in obtaining the TXOP with respect to the channel to receive a corresponding stream for the TXOP duration 330, and for at least one reception apparatus that has failed in obtaining the TOP to operate in a power saving mode.

For example, the TXOP setting frame 320 may include a preamble 321, a legacy signal field (L-SIG) 322, and TXOP setting information 323 that is used for setting the TXOP duration 330.

Each of the first reception apparatus 303, the second reception apparatus 305, the third reception apparatus 307, and the fourth reception apparatus 309 may set a duration of the TXOP with respect to the channel, based on the TXOP setting information 323.

In this example, each of the first reception apparatus 303, the second reception apparatus 305, and the third reception apparatus 307 may receive data from the transmission apparatus 301, and may access a radio channel for the TXOP duration 303 to receive data such as a packet or a frame from the transmission apparatus 301.

Because the fourth transmission apparatus 309 is not to receive data from the transmission apparatus 301, the fourth transmission apparatus 309 may not access the radio channel during the TXOP duration 303.

The TXOP setting information 323 may include information that is associated with a group of data reception apparatuses to receive data from the transmission apparatus 301 from among the first reception apparatus 303, the second reception apparatus 305, the third reception apparatus 307, and the fourth reception apparatus 309.

Each of the first reception apparatus 303, the second reception apparatus 305, the third reception apparatus 307, and the fourth reception apparatus 309 may set the TXOP duration 330 based on the TXOP setting information 323 that is included in the TXOP setting frame 320. For the TXOP duration 330, data transmission may be performed between the transmission apparatus 301 and each of the first reception apparatus 303, the second reception apparatus 305, the third reception apparatus 307, and the fourth reception apparatus 309 using a method that is similar to the method described herein with reference to FIG. 2.

The first reception apparatus 303 may transmit, to the transmission apparatus 301, the response frame 360 with respect to the TXOP setting information 323. The response frame 360 may prevent entangling of reception apparatuses when coverages of a plurality of transmission apparatuses overlap with each other.

An example of overlapped coverages of a plurality of transmission apparatuses is described with reference to FIG. 4.

Figure 4:
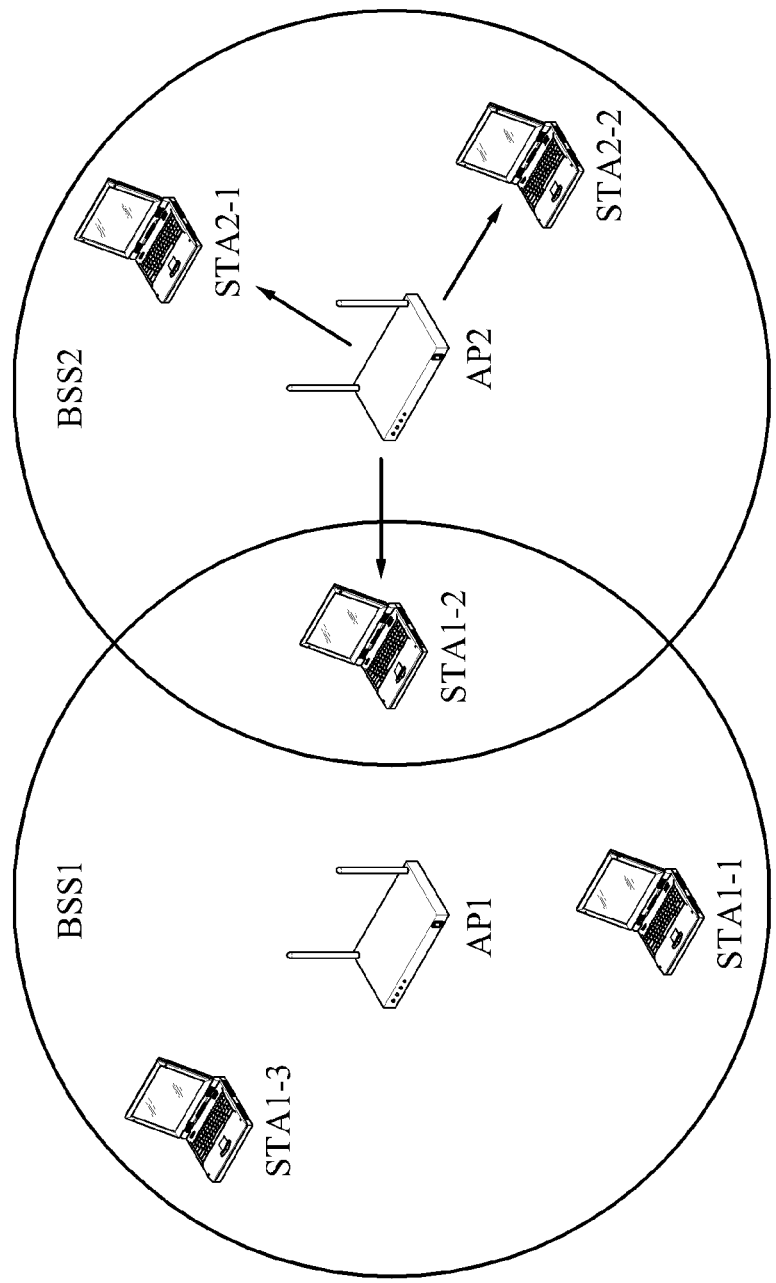
FIG. 4 is a diagram illustrating an example of overlapped neighboring cells or basic service sets (BSSs).

FIG. 4 illustrates an example of overlapped neighboring cells or BSSs.

Referring to FIG. 4, a reception apparatus (STA1-2) corresponds to a terminal that is included in BSS1 and that is also included in a coverage of BSS2. In this example, STA1-2 may receive a frame or a packet from a second transmission apparatus (AP2) as well as a first transmission apparatus (AP1). If the STA1-2 receives a TXOP setting frame, STA1-2 may not be able to identify which BSS the TXOP setting frame was transmitted from.

In this example, due to a TXOP setting frame received from AP2 that is an adjacent overlapped BSS, STA1-2 may be erroneously switched to a power saving mode. Consequently, STA1-2 may not receive a frame from BSS1.

For example, the TXOP setting frame may include information that is associated with an ID of a cell including a reception apparatus or an ID of a BSS including a corresponding reception apparatus. The information may be used to prevent the reception apparatus that is placed in an overlapped BSS area in which neighboring cells or BSSs are overlapped, from being erroneously switched to the power saving mode based on an indication from another transmission apparatus.

Figure 5:
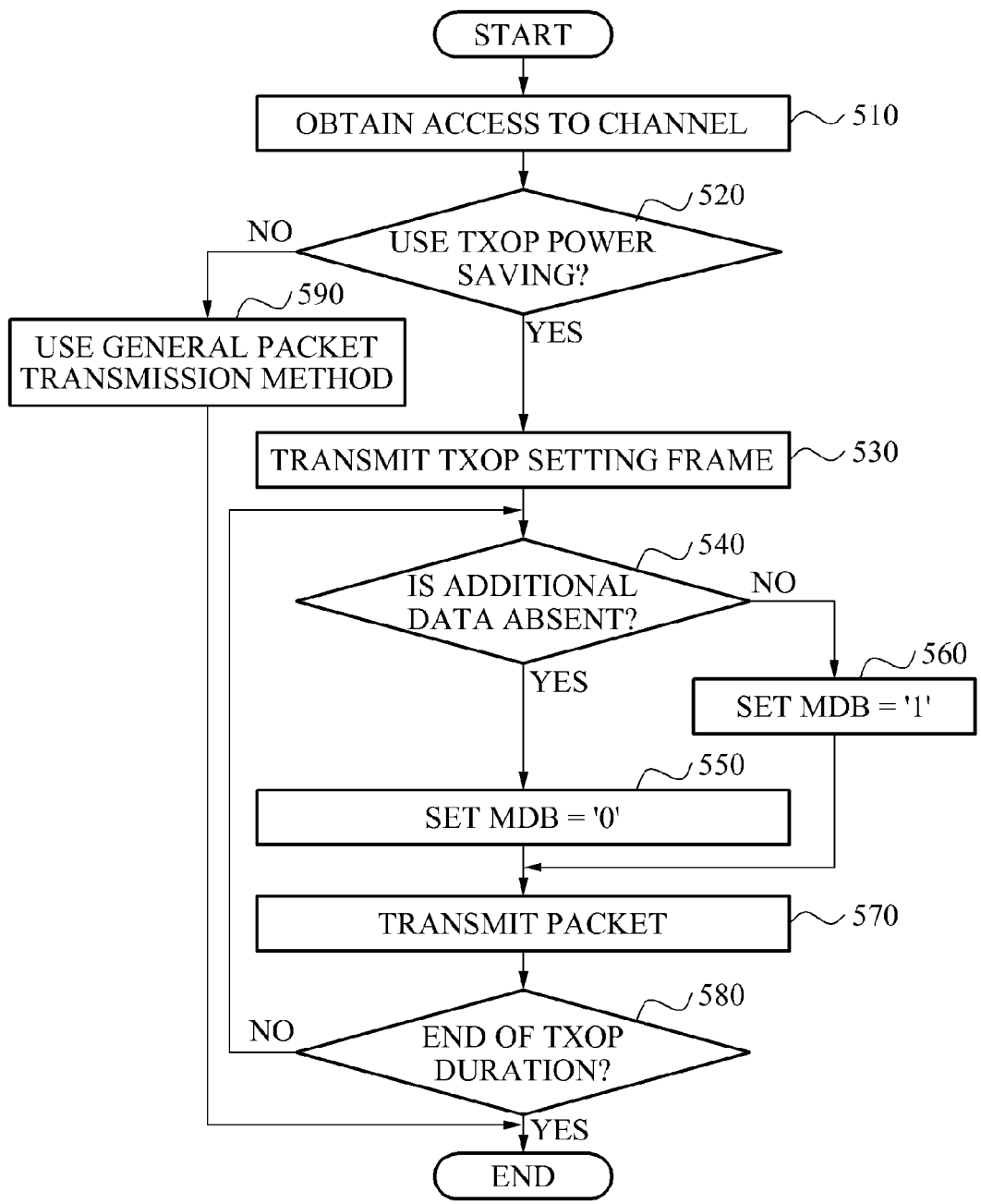
FIG. 5 is a flowchart illustrating an example of a communication method of a transmission apparatus.

FIG. 5 illustrates an example of a communication method of a transmission apparatus.

Referring to FIG. 5, in 510, the transmission apparatus obtains access to a channel to transmit a packet or a frame to one or more reception apparatuses. In 520, the transmission apparatus determines whether the reception apparatuses use TXOP power saving.

In response to the reception apparatuses not using the TXOP power saving, the transmission apparatus transmits the packet or the frame using a general packet transmission method, in 590. Conversely, if the reception apparatuses use the TXOP power saving, the transmission apparatus transmits a TXOP setting frame to the reception apparatuses, in 530.

The TXOP setting frame may be transmitted so that at least one reception apparatus that has succeeded in obtaining a TXOP with respect to a channel may receive a corresponding stream for a duration of the TXOP. The TXOP setting frame may be used so that at least one reception apparatus that has failed in obtaining the TXOP may operate in a power saving mode.

In this example, the transmission apparatus may maintain a stream corresponding to each reception apparatus that has succeeded in obtaining the TXOP from among the reception apparatuses. The transmission apparatus may simultaneously transmit streams corresponding to each reception apparatus that has succeeded in obtaining the TXOP for the duration of the TXOP.

The reception apparatuses may correspond to terminals that belong to predetermined groups that have the same group ID, or separate terminals.

The TXOP setting frame may include information that is associated with an ID of a cell or an ID of a BSS including a corresponding reception apparatus. Accordingly, the TXOP setting frame may prevent the reception apparatus from being erroneously switched to a power saving mode as a result of another transmission apparatus.

In 540, the transmission apparatus determines whether there is additional data to be transmitted to each reception apparatus during the TXOP duration or whether the data is absent.

When the additional data is absent (i.e. there is no more data to transmit to the reception apparatus during the TXOP), the transmission apparatus sets a MDB to zero to indicate that data to be transmitted to a corresponding reception apparatus for the TXOP duration is absent, in 550.

In this example, the MDB set to '0' may be used to indicate that the corresponding reception apparatus is to operate in the power saving mode. Accordingly, to enable the reception apparatus to operate in the power saving mode, the transmission apparatus may not transmit data to the reception apparatus for a remainder of the TXOP duration.

Conversely, if the additional data is present, the transmission apparatus indicates that the additional data is present by setting the MDB to one with respect to the corresponding reception apparatus, in 560.

In 570, the transmission apparatus transmits a packet or a frame to each reception apparatus that has data left to be transmitted during the TXOP. For example, the MDB may be included in a preamble of the packet or a header of a MAC frame to be transmitted to each reception apparatus.

After receiving of the packet with the MDB set to '0', or after transmitting ACK or BA with respect to the packet, the reception apparatus may maintain the power saving mode for the TXOP duration, thereby decreasing the power consumption.

In 580, the transmission apparatus determines whether the TXOP duration ends. If the TXOP duration ends, an operation of the transmission apparatus may be terminated. Conversely, if the TXOP duration does not end, the transmission apparatus may return to 540.

Figure 6:
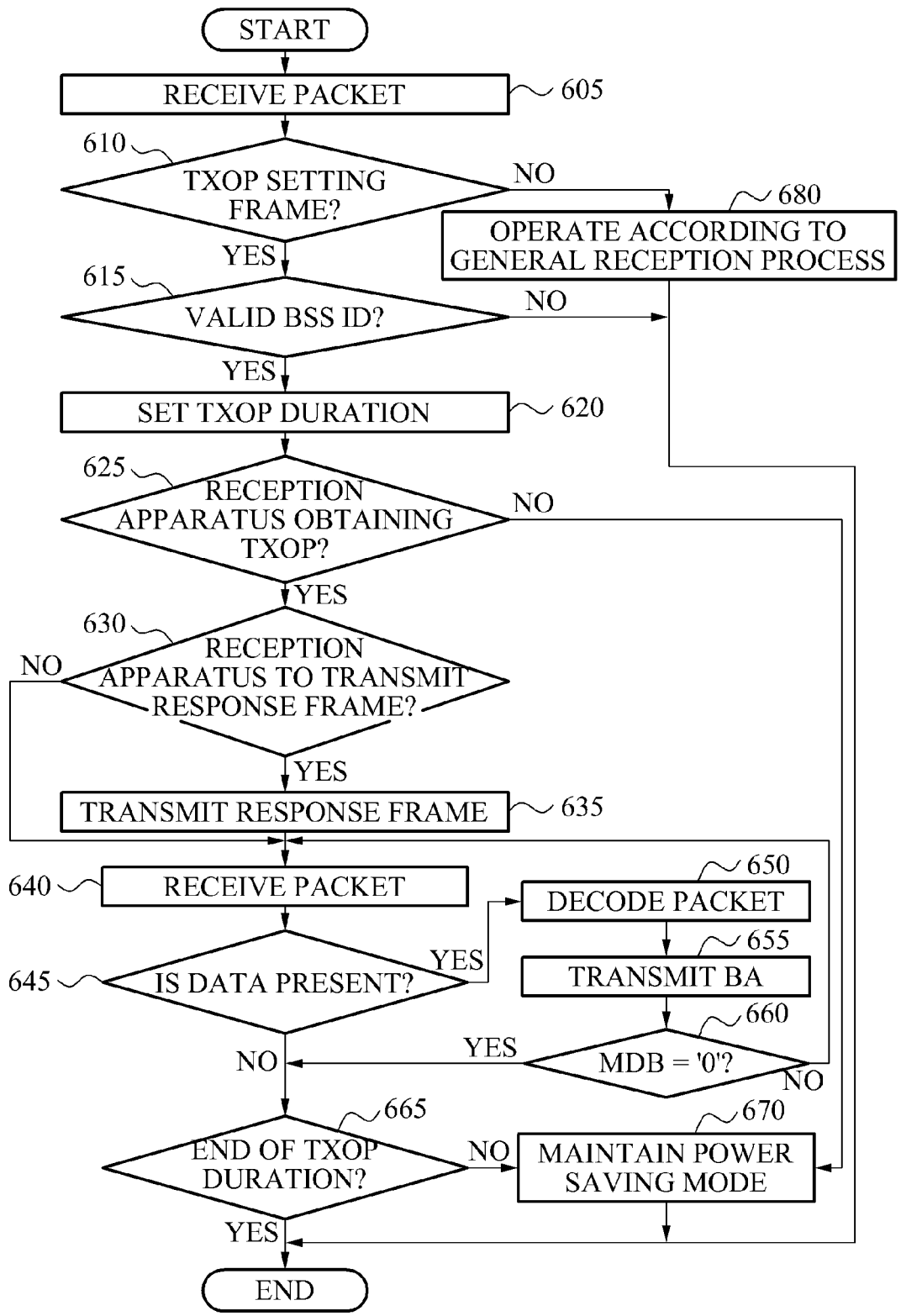
FIG. 6 is a diagram illustrating an example of a communication method of a reception apparatus.

FIG. 6 illustrates an example of a communication method of a reception apparatus.

Referring to FIG. 6, in 605, the reception apparatus receives a packet or a frame from a transmission apparatus. In 610, the reception apparatus verifies whether the received packet or frame is a TXOP setting frame.

The TXOP setting frame may set a terminal that has succeeded in obtaining a TXOP with respect to a channel to receive a corresponding stream for a duration of a TXOP with respect to a channel, that is, a TXOP duration. The TXOP setting frame may set a terminal that has failed in obtaining the TXOP to operate in a power saving mode.

In this example, the TXOP setting frame may include information that is used to set the time duration of the TXOP, and may be generated such that it is capable of being decodable by all of the terminal that have succeeded in obtaining the TXOP and also by the terminals that have failed in obtaining the TXOP.

If the received frame is not the TXOP setting frame, the reception apparatus operates according to a general reception process, in 680. Conversely, if the received frame is the TXOP setting frame, the reception apparatus verifies whether the frame includes a valid BSS ID, in 615.

In this example, the valid BSS ID may indicate information that is associated with an ID of a cell or an ID of a BSS including the reception apparatus. The reception apparatus may verify the valid BSS ID in order to prevent the reception apparatus from erroneously switching to the power saving mode.

If the received frame includes the valid BSS ID, the reception apparatus sets the TXOP duration to either receive the stream from the transmission apparatus for the TXOP duration, or to operate in the power saving mode according to the received TXOP setting frame in 620. As another example, if the received frame does not include the valid BSS ID, an operation of the reception operation may be terminated.

In 625, the reception apparatus determines whether the reception apparatus corresponds to a reception apparatus that is to receive data from the transmission apparatus, that is, a reception apparatus that has succeeded in obtaining the TXOP, based on the TXOP setting frame.

For the TXOP duration, the transmission apparatus may select one or more of a plurality of reception apparatuses, and may transmit data to only the selected reception apparatuses. The transmission apparatus may include an ID of a reception apparatus to receive data, for example, a BSS ID and the like, in TXOP setting information of the TXOP setting frame and may transmit the TXOP setting frame. The reception apparatus may determine whether to receive data for the TXOP duration based on the ID of the reception apparatus that is included in the TXOP setting information.

If the reception apparatus is not determined as the reception apparatus that has succeeded in obtaining the TXOP in 625, the reception apparatus maintains the power saving mode by the end of the TXOP duration, thereby decreasing the power consumption in 670.

In 630, the reception apparatus verifies whether the reception apparatus corresponds to a reception apparatus that is to transmit a response frame with respect to the TXOP setting frame based on the determination result of 625. If the reception apparatus is verified as the reception apparatus to transmit the response frame, in 630, the reception apparatus transmits the response frame or a packet to the transmission apparatus 635.

In 640, the reception apparatus receives a packet from the transmission apparatus.

Conversely, if the reception apparatus is not verified as the reception apparatus to transmit the response frame in 630, the reception apparatus may advance to step 640 without transmitting the response frame.

In 640, the reception apparatus receives a packet. For example, the reception apparatus may receive an indicator indicating that data to be transmitted to the reception apparatus for the TXOP duration is absent. For example, an MDB may be used as the indicator to indicate that more data to be transmitted to the reception apparatus is absent. For example, when the MDB is set to '1' may be used to indicate that data to be transmitted to the reception apparatus is present. As another example, when the MDB is set to '0' may be used to indicate that data to be transmitted to the reception apparatus is absent.

In 645, the reception apparatus verifies whether data transmitted from the transmission apparatus to the corresponding reception apparatus is present. If there is no data transmitted to the corresponding reception apparatus in 645, the reception apparatus verifies whether the TXOP duration ends, in 665, without decoding the data. Conversely, if there is data transmitted to the corresponding reception apparatus in 645, the reception apparatus decodes the packet, in 650, and transmits a BA with respect to the received packet in 655.

In 660, the reception apparatus verifies whether MDB is set to '0'. If the MDB is set to '1', the reception apparatus returns to 640 and receives the packet. Conversely, if the MDB is set to '0', the reception apparatus verifies whether the TXOP duration ends in 665.

If the TXOP duration ends, an operation of the reception apparatus may be terminated. Conversely, if the TXOP duration does not end, the reception apparatus maintains the power saving mode by the end of the TXOP duration, in 670. After terminating receiving of the packet or after transmitting an ACK or a BA with respect to the packet, the reception apparatus may maintain the power saving mode for the TXOP duration.

Figure 7:
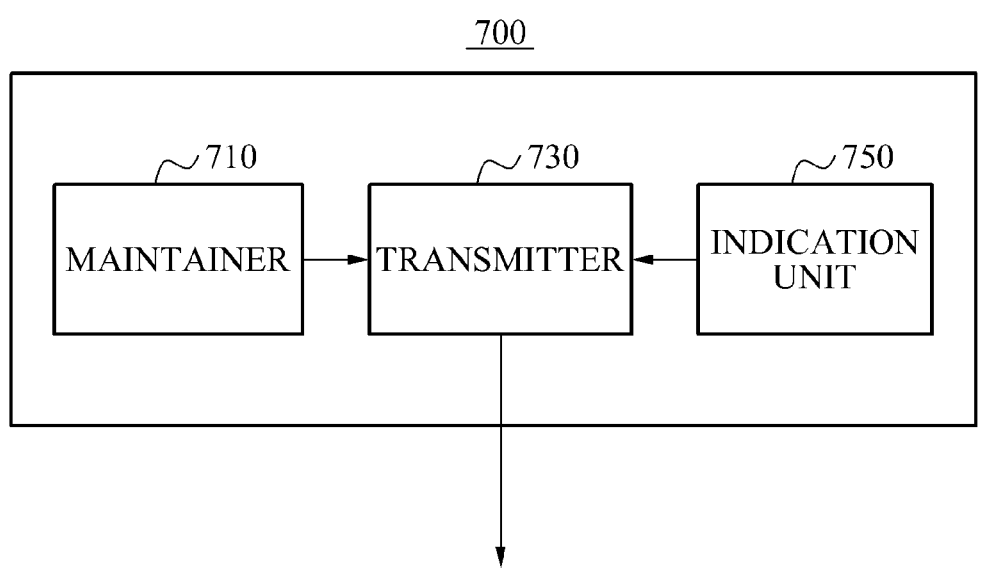
FIG. 7 is a diagram illustrating an example of a transmission apparatus.

FIG. 7 illustrates an example of a transmission apparatus.

Referring to FIG. 7, transmission apparatus 700 includes a maintainer 710 and a transmitter 730.

The maintainer 710 may maintain a stream corresponding to each terminal that has succeeded in obtaining a TXOP with respect to a channel.

The transmitter 730 may transmit a TXOP setting frame in which at least one terminal that has succeeded in obtaining a TXOP with respect to a channel is set to receive a stream from a transmission apparatus for a duration of the TXOP, and at least a second terminal that has failed in obtaining the TXOP is set to operate in a power saving mode.

The transmitter 730 may simultaneously transmit streams corresponding to the at least one terminal using the channel for the time duration of the TXOP.

The transmission apparatus 700 may further include an indication unit 750. The indication unit 750 may indicate a predetermined terminal to operate in a power saving mode.

The transmission apparatus 700 may not transmit data to the predetermined terminal for a remainder of the time duration of the TXOP. The indication unit 750 may generate an indicator that indicates that there is no data to be transmitted to the predetermined terminal for the duration of the TXOP (i.e. data is absent).

Figure 8:
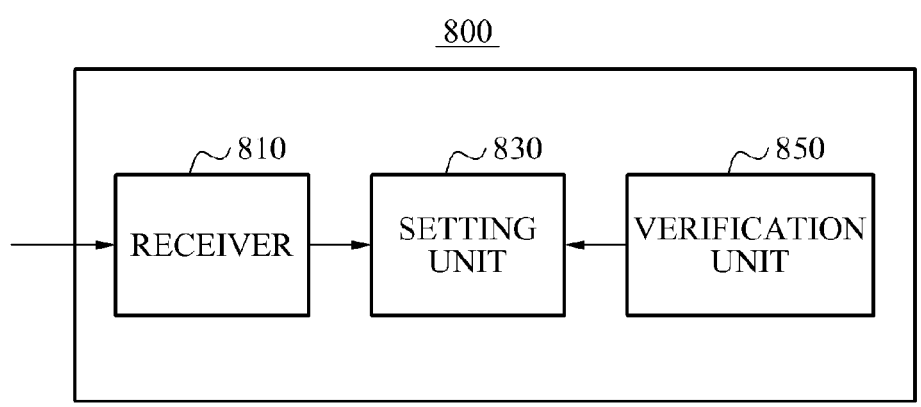
FIG. 8 is a diagram illustrating an example of a reception apparatus.

FIG. 8 illustrates an example of a reception apparatus.

Referring to FIG. 8, reception apparatus 800 includes a receiver 810 and a setting unit 830.

The receiver 810 may receive, from a transmission apparatus, a TXOP setting frame in which at least one terminal that has succeeded in obtaining a TXOP with respect to a channel is set to receive a stream for a duration of the TXOP, and at least second terminal that has failed in obtaining the TXOP is set to operate in a power saving mode.

The setting unit 830 may receive a stream from the transmission apparatus for the duration of the TXOP, or may set an operation mode to the power saving mode, in response to the received TXOP setting frame.

Streams corresponding to the at least one terminal may be simultaneously transmitted using the channel for the duration of the TXOP.

The reception apparatus 800 may further include a verification unit 850. The verification unit 850 may verify whether the TXOP setting frame includes information that is associated with an ID of a BSS or an ID of a cell including the reception apparatus 800.

In various examples, if at least one terminal obtains a TXOP with respect to a channel, the at least one terminal may transmit a corresponding stream, thereby enhancing transmission efficiency without an additional contention and guaranteeing quality of service (QoS).

In various examples, at least one terminal that has failed in obtaining a TXOP may be set to operate in a power saving mode using a TXOP setting frame, thereby decreasing a reception standby time and a reception standby power with respect a corresponding terminal.

In various examples, if data to be transmitted to terminals that have obtained a TXOP with respect to a channel is absent, the terminals may be set to operate in a power saving mode, thereby minimizing overhearing of a frame or a packet transmitted to another terminal and decreasing a reception standby power of a terminal.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running The apparatuses described herein may be or may be included in a terminal. As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a to handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmission apparatus, the method comprising:
   identifying a terminal that has acquired a transmission opportunity (TXOP);
   maintaining a stream corresponding to a plurality of terminals that have succeeded in obtaining a transmission opportunity (TXOP) with respect to a channel;
   transmitting a packet using multi-user multiple-input multiple-output (MU-MIMO) communication, wherein
   the packet indicates the identified terminal, includes a data frame to be communicated to the identified terminal, indicates whether the transmission apparatus will transmit another packet to the terminal during the TXOP, and simultaneously indicates at least one terminal that has not acquired the TXOP to operate in a power saving mode; and
   transmitting a TXOP setting frame using MU-MIMO communication, wherein
   the TXOP setting frame comprises an identifier (ID) of a basic services set (BSS) or an ID of a cell including the terminal to prevent the terminal from erroneously switching to a power saving mode according to an instruction from another transmission apparatus.

2. The method of claim 1, further comprising:
identifying a plurality of terminals that have acquired the TXOP; and
simultaneously transmitting streams, each of which corresponds to one of the plurality of terminals, during the TXOP.

3. The method of claim 1, wherein if the packet indicates that the transmission apparatus will not transmit another packet to the terminal during the TXOP, the terminal will operate in a power saving mode during the transmission of all further packets within the TXOP.

4. The method of claim 3, further comprising:
identifying another terminal that has acquired the TXOP; and
indicating in the packet that the transmission apparatus will transmit another packet to the other terminal during the TXOP.

5. The method of claim 1, wherein the indication of whether the transmission apparatus will transmit another packet to the terminal during the TXOP is communicated to the terminal in a preamble of a packet to be transmitted to the terminal or a header of a media access control (MAC) frame to be transmitted to the terminal.

6. The method of claim 4, wherein if the terminal is operating in the power saving mode, due to the packet indicating that the transmission apparatus will not transmit another packet to the terminal during the TXOP, and the transmission apparatus acquires additional data to be transmitted to the terminal, the transmission apparatus buffers the additional data until it is be communicated to the terminal in a subsequent TXOP.

7. The method of claim 1, wherein the indication of the terminal is included in control information for the data frame.

8. The method of claim 1, wherein:
the TXOP setting frame comprises information that is used to set a time duration of the TXOP and is capable of being decoded by the terminal and another terminal that was unsuccessful in obtaining the TXOP.

9. The method of claim 2, wherein the plurality of terminals belong to a predetermined group identified by a group identifier.

10. A communication method of a reception apparatus, the method comprising:
receiving, from a transmission apparatus, a transmission opportunity (TXOP) packet using multi-user multiple-input multiple-output (MU-MIMO) communication, wherein the packet identifies a terminal, includes a data frame to be communicated to the identified terminal, and indicates whether the transmission apparatus will transmit another packet to the identified terminal during the TXOP;
decoding the data frame when the identified terminal is the reception apparatus;
receiving the other packet when the identified terminal is the reception apparatus and the packet indicates that the other packet will be transmitted; and
receiving a TXOP setting frame using MU-MIMO communication, wherein
the TXOP setting frame comprises an identifier (ID) of a basic services set (BSS) or an ID of a cell including the terminal to prevent the terminal from erroneously switching to a power saving mode according to an instruction from another transmission apparatus.

11. The method of claim 10, wherein the packet identifies a plurality of terminals and includes a separate data frame to be communicated to each of the identified terminals.

12. The method of claim 10, further comprising:
determining whether the TXOP setting frame comprises an identifier (ID) of a basic service set (BSS) or an ID of a cell including the reception apparatus.

13. The method of claim 10, further comprising:
receiving a TXOP setting frame, using MU-MIMO communication, that identifies a terminal;
determining whether the reception apparatus corresponds to the terminal identified by the TXOP setting frame from among a plurality of terminals; and
transmitting a response frame with respect to the TXOP setting frame based on the determination result.

14. The method of claim 10, further comprising setting an operation mode of the reception apparatus to a power saving mode for a period during which all further packets are communicated during the TXOP when the packet indicates that the transmission apparatus will not transmit another packet to the reception apparatus during the TXOP.

15. The method of claim 14, further comprising maintaining the power saving mode for the duration of the TXOP after transmitting a block acknowledgement (ACK) with respect to the data frame.

16. The method of claim 10, wherein the reception apparatus belongs to a predetermined group of terminals having the same group identifier.

17. The method of claim 10, wherein:
the TXOP setting frame comprises information that is used to set a duration of the TXOP and that is generated such that it is capable of being decoded by a plurality of terminals that succeeded in obtaining the TXOP and a terminal that was unsuccessful in obtaining the TXOP.

18. A non-transitory computer-readable storage medium having stored therein program instructions to cause a processor of a reception apparatus to implement a method comprising:
receiving, from a transmission apparatus, a transmission opportunity (TXOP) packet using multi-user multiple-input multiple-output (MU-MIMO) communication, wherein the packet identifies a terminal, includes a data frame to be communicated to the identified terminal, and indicates whether the transmission apparatus will transmit another packet to the identified terminal during the TXOP;
decoding the data frame when the identified terminal is the reception apparatus;
receiving the other packet when the identified terminal is the reception apparatus and the packet indicates that the other packet will be transmitted; and
receiving a TXOP setting frame using MU-MIMO communication, wherein
the TXOP setting frame comprises an identifier (ID) of a basic services set (BSS) or an ID of a cell including the terminal to prevent the terminal from erroneously switching to a power saving mode according to an instruction from another transmission apparatus.

19. A transmission apparatus comprising:
a processor configured to identify a terminal that has acquired a transmission opportunity (TXOP); and
a transmitter configured to transmit a packet using multi-user multiple-input multiple-output (MU-MIMO) communication, wherein
the packet indicates the identified terminal, includes a data frame to be communicated to the identified terminal, and indicates whether the transmission apparatus will transmit another packet to the terminal during the TXOP, and wherein the transmitter is further configured to transmit a TXOP setting frame using MU-MIMO communication, wherein the TXOP setting frame comprises an identifier (ID) of a basic service set (BSS) or an ID of a cell including the terminal to prevent the terminal from erroneously switching to a power saving mode according to an instruction from another transmission apparatus.

20. The transmission apparatus of claim 19, wherein the transmitter is configured to simultaneously transmit streams corresponding to a plurality of terminals using a channel during the TXOP.

21. A reception apparatus comprising:
a receiver configured to receive, from a transmission apparatus, a transmission opportunity (TXOP) packet using multi-user multiple-input multiple-output (MU-MIMO) communication, wherein the packet identifies a terminal, includes a data frame to be communicated to the identified terminal, and indicates whether the transmission apparatus will transmit another packet to the identified terminal during the TXOP;
a decoder configured to decode the data frame when the identified terminal is the reception apparatus; and
a processor configured to set an operation mode to a power saving mode when the identified terminal is not the reception apparatus, and
wherein the receiver is further configured to receive a TXOP setting frame using MU-MIMO communication, wherein
the TXOP setting frame comprises an identifier (ID) of a basic service set (BSS) or an ID of a cell including the terminal to prevent the terminal from erroneously switching to a power saving mode according to an instruction from another transmission apparatus.

22. The reception apparatus of claim 21, wherein the packet includes a separate data frame for each of a plurality of terminals.

23. A terminal comprising:
a receiver configured to receive a transmission opportunity (TXOP) packet using multi-user multiple-input multiple-output (MU-MIMO) communication, wherein the packet identifies a target terminal, includes a data frame to be communicated to the identified target terminal, and indicates whether the transmission apparatus will transmit another packet to the identified target terminal during the TXOP;
a decoder configured to decode the data frame when the identified target terminal is the terminal; and
a processor configured to set an operation mode to a power saving mode when the identified target terminal is not the terminal, and
wherein the receiver is further configured to receive a TXOP setting frame using MU-MIMO communication, wherein
the TXOP setting frame comprises an identifier (ID) of a basic service set (BSS) or an ID of a cell including the terminal to prevent the terminal from erroneously switching to a power saving mode according to an instruction from another transmission apparatus.

24. The terminal of claim 23, wherein the processor sets the power saving mode upon decoding the data frame when the identified target terminal is the terminal and the packet indicates that the transmission apparatus will not transmit another packet to the terminal during the TXOP.

25. The terminal of claim 23, wherein the indication of whether the transmission apparatus will transmit another packet to the identified target terminal during the TXOP is communicated to the terminal in a preamble of a packet or in a header of a media access control (MAC) frame.

26. The terminal of claim 23, wherein:
the TXOP setting frame includes an identifier of the transmission apparatus that transmits the TXOP setting frame.

* * * * *